M. A. REPLOGLE.
SOAPSTONE BRUSH.
APPLICATION FILED OCT. 25, 1916.
1,281,660.
Patented Oct. 15, 1918.
2 SHEETS—SHEET 1.
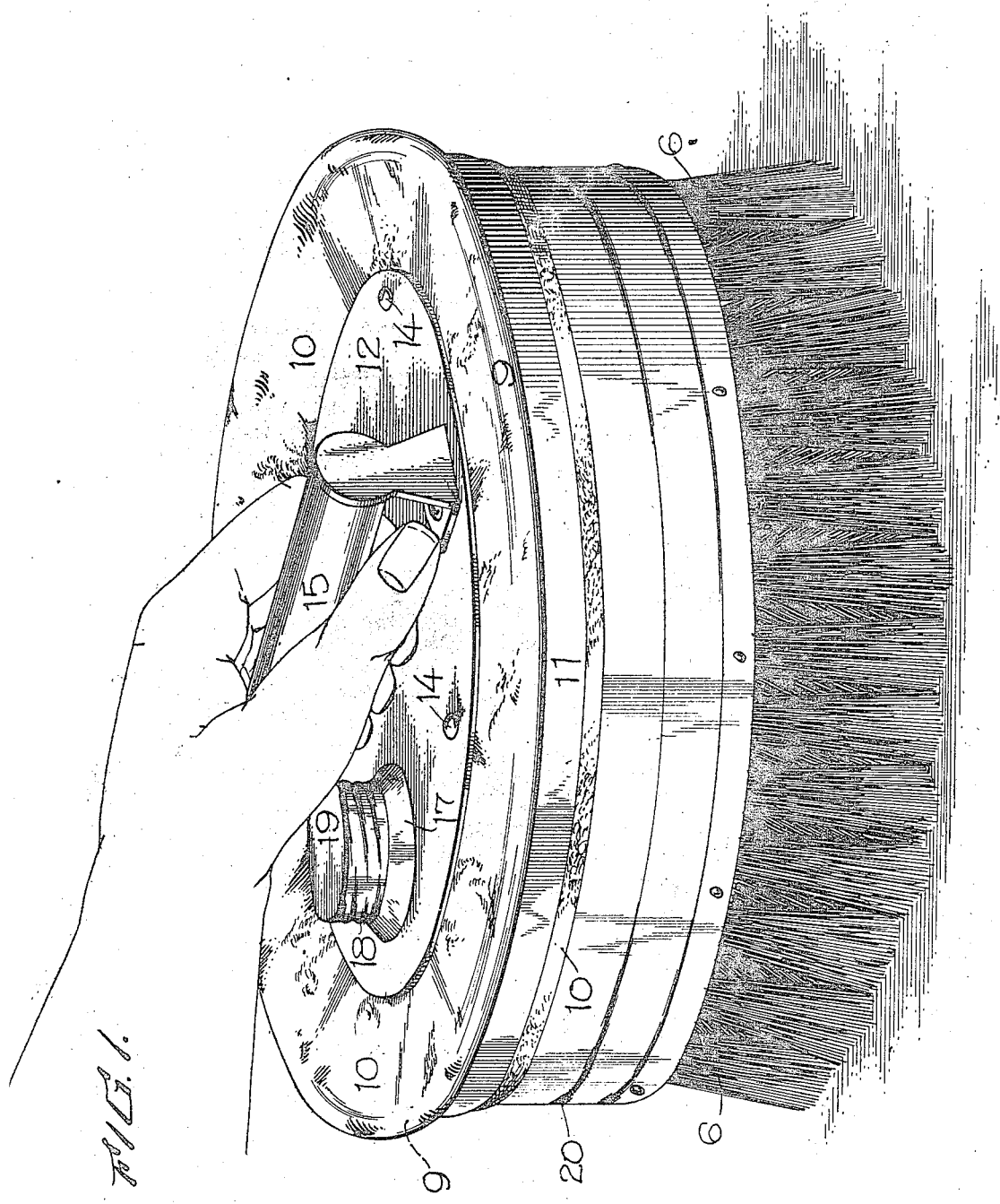
Inventor
Mark A. Replogle.

M. A. REPLOGLE.
SOAPSTONE BRUSH.
APPLICATION FILED OCT. 25, 1916.
1,281,660.
Patented Oct. 15, 1918.
2 SHEETS—SHEET 2.
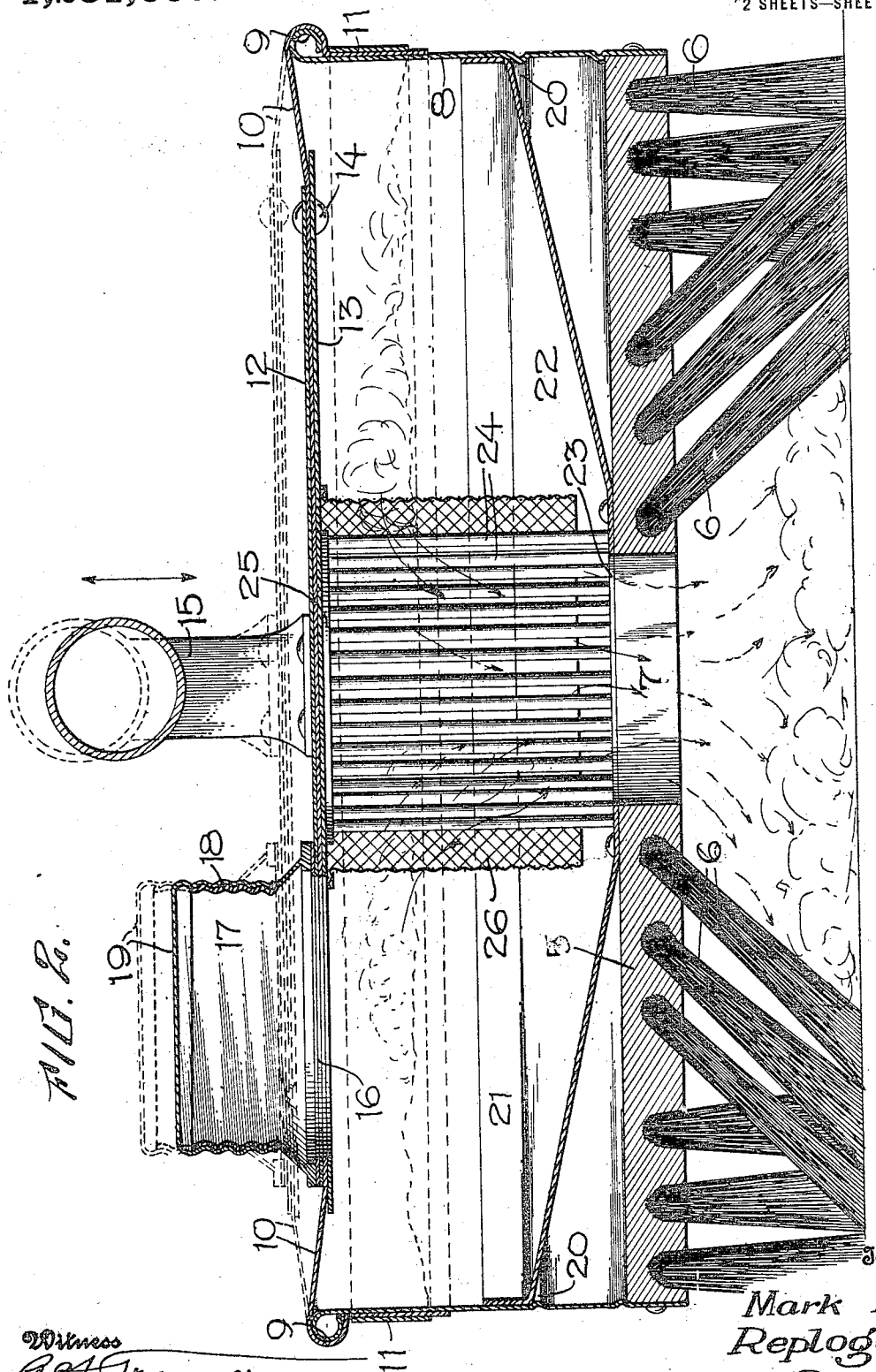
Inventor
Mark A. Replogle
By C. L. Landon
Attorney
Witness
A. F. Trogner

UNITED STATES PATENT OFFICE.

MARK A. REPLOGLE, OF AKRON, OHIO, ASSIGNOR TO THE GOODYEAR TIRE &. RUBBER COMPANY, OF AKRON, OHIO, A CORPORATION OF OHIO.

SOAPSTONE-BRUSH.

1,281,660.

Specification of Letters Patent.

Patented Oct. 15, 1918.

Application filed October 25, 1916. Serial No. 127,573.

*To all whom it may concern:*

Be it known that I, MARK A. REPLOGLE, a citizen of the United States, residing at Akron, in the county of Summit and State of Ohio, have invented new and useful Improvements in Soapstone-Brushes, of which the following is a specification.

My present invention relates to a hand apparatus for applying powdered soapstone to rubber stock, and comprehends, as a principal object, the provision of means for disposing the powdered soapstone upon the stock and for brushing it over the surface of the stock in such a manner that the operator is not inconvenienced by the creation of clouds of dust during the application of the soapstone.

In the industries concerned in the manufacture of articles from rubber, it is recognized as important that the new rubber stock be dusted with a suitable powder to counteract the adhesiveness of the stock to such an extent as to permit of handling, without, however, interfering with the adhesive qualities of the rubber stock when the powder has been washed off. Soapstone, in its powdered form, is one of the many substances employed for this purpose, yet its convenient use is frequently found to be difficult, owing to the fact that powdered soapstone is apt to cake within any usual type of dispensing container.

In order to obviate the difficulty of having the soapstone caked within its container, one customary method employed to dust the powder over the rubber stock comprises the use of bags filled with the soapstone which the operator grasps and then slaps smartly down upon the surface to be dusted. This method has, however, the disadvantage of causing clouds of dust which form a serious inconvenience to the worker.

It is, therefore, contemplated in the present invention to provide means for dispensing soapstone which provides for the dusting of the powder over the surface of the rubber stock without creating obnoxious dust clouds, by the use of a container of such construction that caking of the powder does not interfere with the ready dispensing thereof.

It is an object of equal importance with the foregoing to provide a dispensing container for powdered materials which comprehends the disposal of the dispensed substance, by brushing means, over the surface to be dusted.

It is a more specific object of this invention to provide a dispensing soapstone brush of such nature that the soapstone may be delivered to the brush portion of the device by means of pneumatic pressure which is to be set up within the device by the hand of the user during manual wielding of the instrument.

The above and additional objects of a similar nature which will be hereinafter more specifically treated, are preferably accomplished by such means as are illustrated in the accompanying drawings, described in the following specification, and then more particularly pointed out in the claims which are appended hereto and form a part of this application.

With reference to the drawings, wherein there has been illustrated a preferred embodiment of the invention as it is reduced to practice, and throughout the several views of which, similar reference numbers designate corresponding parts.

Figure 1 is a view in perspective illustrating the method of operating the powder brushing means of this invention; and Fig. 2 is a cross-sectional view taken through the brush illustrating the interior construction thereof.

The invention includes broadly a container body, the bottom of which supports the bristles of the brush, and the top of which is formed as a flexible diaphragm. Connected to the diaphragm are means of a suitable nature for breaking up any lumps of soapstone caked within the container body, as the diaphragm top is reciprocated by the user, who, in wielding the instrument, grasps the handle secured to the top. The dispensed soapstone is deposited in the center of the brush portion of the device and is distributed thereby without the creation of dust clouds over the surface to be dusted by the same sweeping movements of the user's arm which dispensed the soapstone in the first place.

I may here point out that while I have described my present device as a soapstone brush, that I may use it for the application of any powdered substance which may be deemed fit, such as potato flour, French talc and the like.

In the base board 5 of the body of the instrument, there are embedded the bunches of bristles 6 arranged in the form of concentric rings which constitute the brush portion of the instrument. Preferably as illustrated the brush portion comprises two concentric groups of bristles, the bristles of the outer group bearing vertically upon the surface to be dusted, but the bristles of the inner group being arranged at an outward angle such that a considerable space is formed upon the interior of the brush. While this arrangement of the brush bristles is desirable in order to provide a suitable dispensing surface on the interior thereof, it is not, of course, absolutely requisite, providing a sufficient dispensing surface is left within the interior of the brush. Through the bottom 5 of the container there is formed an aperture 7 through which the powder may be dispensed from the container to the brush interior, thus confining the dust clouds where they cannot harm the worker.

A cylindrical body portion 8 is peripherally secured upon the brush-mounting bottom 5, and as shown, may be desirably constructed from sheet metal. The upper edge of the metallic sheet forming the cylindrical body of the container is rolled back upon itself in the manner denoted by the numeral 9 in order to provide a rounded, beaded edge. Forming the top of the container and overlying the beaded edge 9 thereof is the flexible diaphragm 10 which may be of leather or a suitable tough fabric. A securing band 11 engages the edges of the diaphragm 10 to fasten it upon the body of the container, in the manner illustrated.

The flexible diaphragm 10 supports a rigid top for the instrument which includes upper and lower plates 12 and 13, which are connected by securing means 14 which maintain them upon the center of the diaphragm 10. A handle 15 of any suitable construction is carried by the top plate 12 while both the plates and the interposed diaphram are apertured to provide the filling hole 16, over which is erected the neck 17, formed with screw threads 18 adapted to accommodate the cap 19 thereon.

At a point between the diaphragm 10 and the bottom 5 of the container, the cylindrical wall 8 is provided with an inturned annular rib 20 which is adapted to support the bottom of a securing flange 21, the latter being integral with the dispensing cone 22, which is thus supported within the container body 8. A central opening 23 is provided in the dispensing cone in alinement with the dispensing aperture 7 formed in the brush base. Any powdered material which is placed within the container body 8 will thus be directed, by the sloping wall of the cone, toward the dispensing hole leading to the interior of the brush 6.

The means which I have provided to prevent caking of the soapstone and to insure the even distribution of the powder, consists of a number of bars 24 which are grouped in a cylindrical fashion and at such intervals that relatively narrow spaces are revealed between adjacent bars. The diameter of the cylindrical group of bars 24 is such that the bases of the latter may rest upon the base of the dispensing cone 22 in a concentric fashion about the exit aperture 7 of the container base. All of these bars 24 are secured within the container at their bases and bear, at their upper extremities, a plate 25 which acts as a stop for the reciprocable cover of the container. The plate 25 also prevents air, set in motion within the instrument by the bellows action of the cover diaphragm, from passing over the upper ends of the grouped bars 24, all the air which is expelled through the exit aperture 7, therefore, passing through the bar interstices. Surrounding the cylindrical group of bars is a cylinder 26 of wire mesh which is dependent from the cover plate 13, and is reciprocable therewith.

When my dusting instrument has been filled with the powder which it is desired to brush over the surface of raw rubber stock or other material to be dusted, the operator grasps the handle 15 and moves the instrument over the surface to be treated. As he sweeps the brush back and forth across this surface, the flexible cover diaphragm 10 will be reciprocated along the axis of the container body in the manner illustrated by the dotted lines of Fig. 2. The cylindrically grouped bars 24 limit downward movement of the cover and the wire mesh cylinder 26 is also reciprocated with the cover and serves to crush and disintegrate any caked particles of the contained powder.

The bellows action of the top of the instrument displaces the air within the container, driving it through the group of bars and then the aperture 7, and with it such quantity of the loose powder as may be pneumatically expelled at the same time. On being dispensed through the bottom of the container, the powder is then acted on by the brush members 6 and spread or dusted over the whole surface which is to be treated. The powder within the container body 8 usually cakes along the bottom of the dispensing cone 22, and against the group of stationary bars 24, so that a superfluous quantity of powder is not dispensed as the instrument is wielded, the pneumatic draft occasioned by operation of the bellows top of the container dispensing the powder in a relatively sparing fashion.

What I claim is:

1. In an instrument of the character set forth, a rigid container; bristles attached to the base of said container; a flexible top secured to said container; plates carried by said flexible top; bars grouped to restrict the feeding of the container's contents to the bristles portion of the instrument, and means surrounding the bars and reciprocable by movement of the top to break up lumps caused by a caking of the container's contents.

2. An instrument of the character described including a container, bristles attached to the base of the container and arranged to form an annular belt which defines a central cavity in the body of the bristles; there being an opening in the base leading into the cavity defined by the bristles; a flexible top for the container, said top being adapted for reciprocation with respect to the base for the purpose of expelling, by pneumatic action, from the container into the cavity defined by the bristles, the contents of the container; and bars arranged adjacent to the opening in the base to restrict the feeding of the container's contents, said bars adapted to limit inward movement of said flexible top.

3. An instrument of the character specified, comprising a container, bristles attached to the base of the container, a flexible diaphragm on said container, means to restrict the feeding of the container's contents to the bristles portion of the instrument, and means actuated by movement of the flexible diaphragm to break up lumps of the contents.

4. An instrument of the character specified, comprising a container having an outlet aperture in the base portion thereof, and a sloping surface surrounding said aperture, brushing means attached to said base portion, a flexible diaphragm on said container, means to restrict the feeding of the container's contents through said outlet aperture to the brushing means, and means actuated by the movement of the flexible diaphragm to break up lumps of the contents.

5. An instrument of the character specified, comprising a container having an outlet aperture, brushing means attached to the container, a flexible diaphragm on said container, and intersticial means adjacent to the outlet aperture, said means adapted to limit the movement of the diaphragm and restrict the feeding of the container's contents through said outlet aperture to the brushing means.

In testimony whereof, I have signed my name in the presence of two subscribing witnesses.

MARK A. REPLOGLE.

Witnesses:
L. E. WAGNER,
B. J. McDANEL.